United States Patent [19]

Otani et al.

[11] Patent Number: 4,604,865
[45] Date of Patent: Aug. 12, 1986

[54] EXHAUST SYSTEM AIR INTRODUCTION DEVICE

[75] Inventors: Junji Otani, Saitama; Akira Okubo, Tokyo; Kanau Iwashita, Saitama, all of Japan

[73] Assignee: Honda Giken Kogyo Kabushiki Kaisha, Tokyo, Japan

[21] Appl. No.: 485,202

[22] Filed: Apr. 15, 1983

[30] Foreign Application Priority Data

Apr. 24, 1982 [JP] Japan .................................. 57-69185
Apr. 24, 1982 [JP] Japan .................................. 57-69186

[51] Int. Cl.⁴ ............................................... F01N 3/30
[52] U.S. Cl. ......................................... 60/293; 60/305
[58] Field of Search .......................... 60/293, 304, 305

[56] References Cited

U.S. PATENT DOCUMENTS 4,154,058  5/1979  Mase ...................................... 60/293
4,430,857  2/1984  Ikenoya ................................. 60/293

FOREIGN PATENT DOCUMENTS 161911 12/1980 Japan ..................................... 60/293

Primary Examiner—Douglas Hart
Attorney, Agent, or Firm—Lyon & Lyon

[57] ABSTRACT

A device for introducing air into the exhaust system of a V-type motorcycle engine. The device includes an air manifold advantageously positioned within the V of the engine with passages extending to each exhaust passage adjacent each exhaust port. A control valve run by vacuum admits air to the manifold while reed valves control the passageways to each exhaust passage. The portion of the passage extending through the cylinder head in one embodiment includes a simple bore in tangential intersection with the exhaust passages. A pipe is positioned within the bore which has nozzles therethrough for proper introduction of air to the exhaust.

24 Claims, 13 Drawing Figures

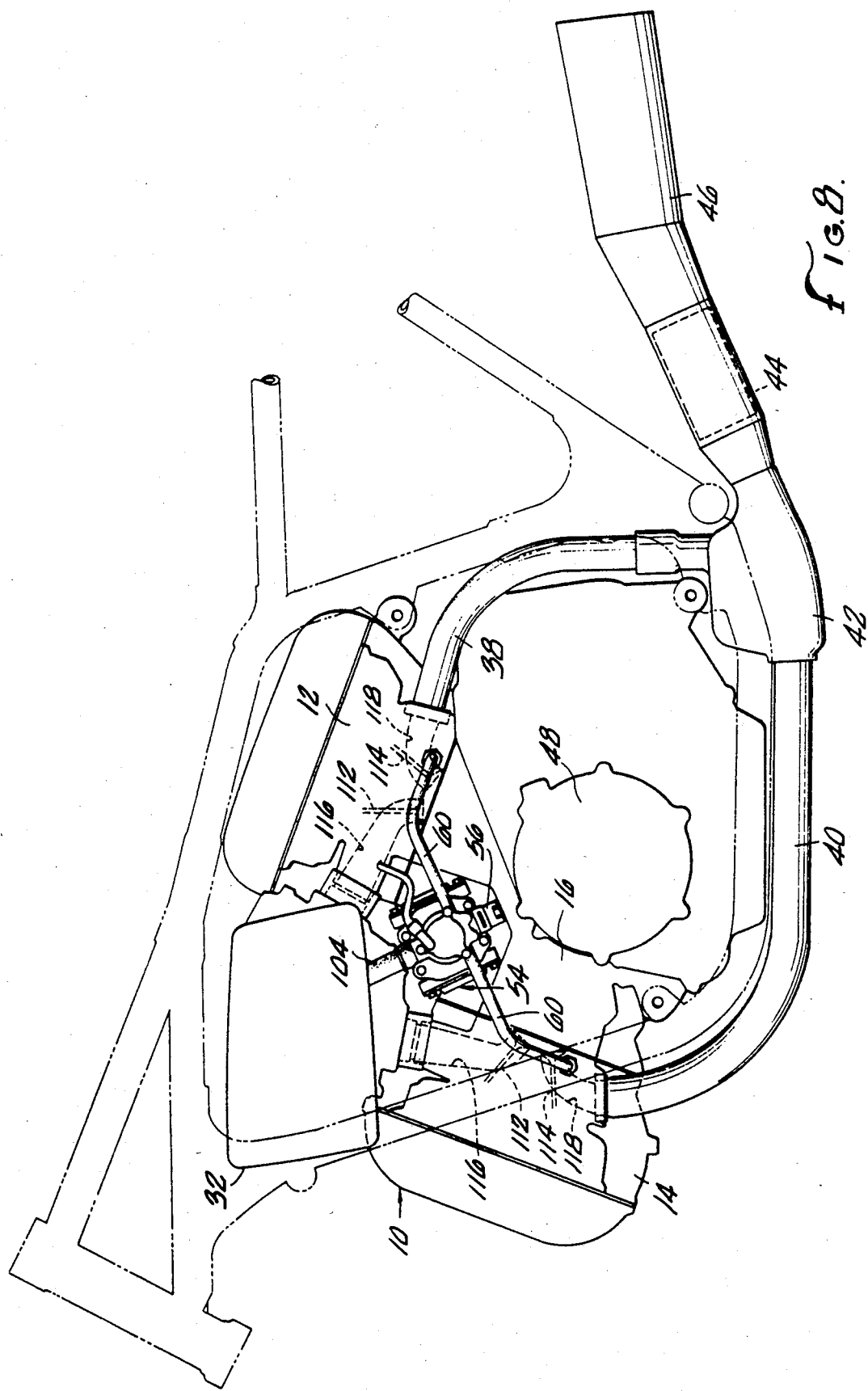

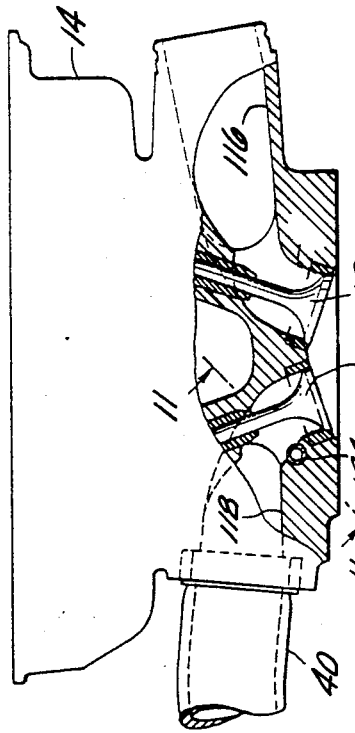
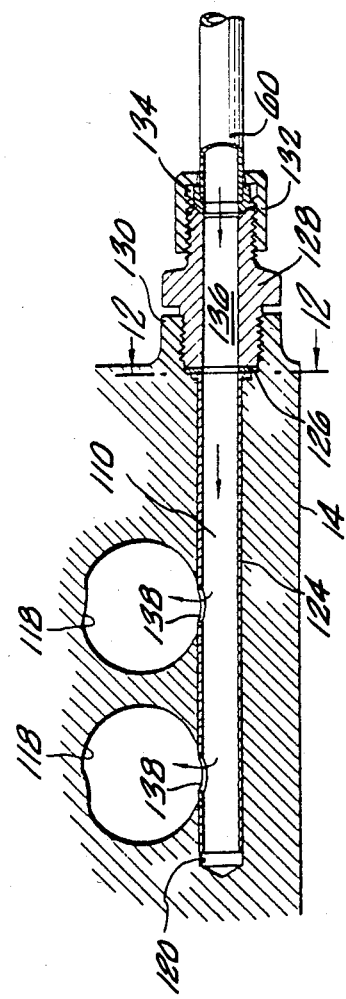
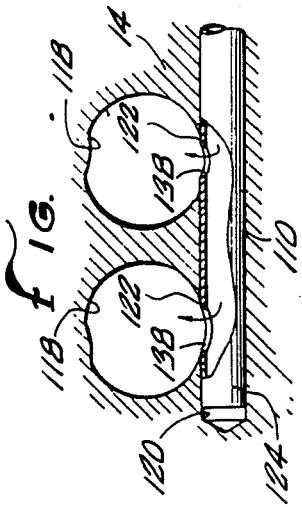
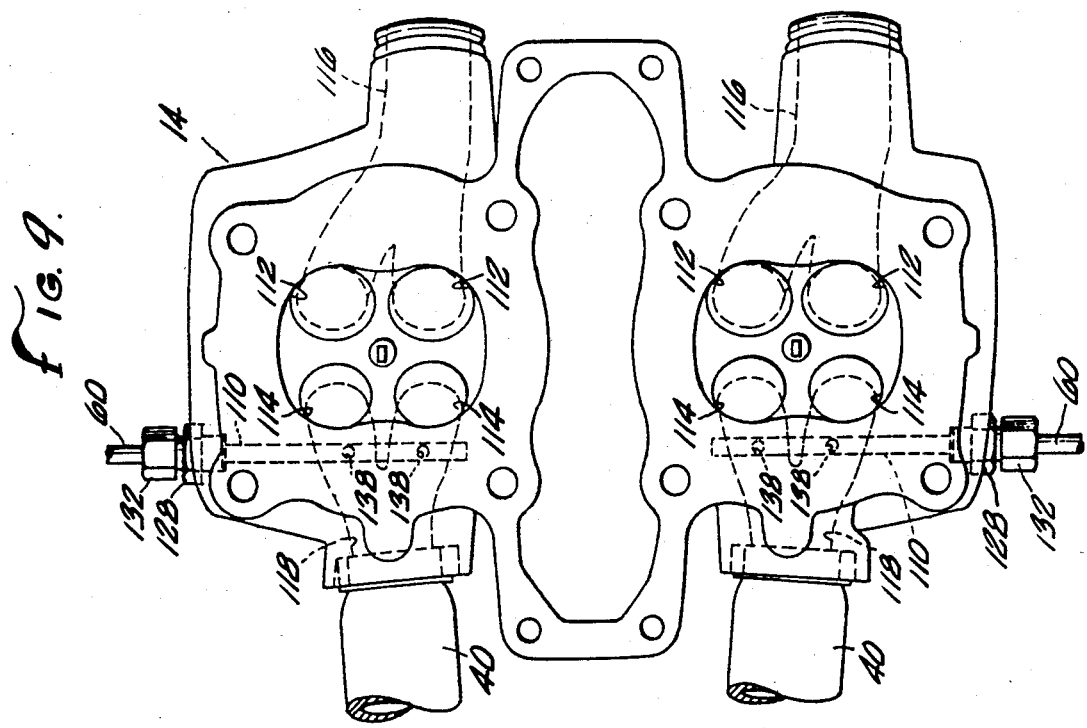

EXHAUST SYSTEM AIR INTRODUCTION DEVICE

BACKGROUND OF THE INVENTION

The field of the present invention is pollution control systems for engine exhaust and particularly air introduction systems therefor.

With the advent of emissions control requirements for automobiles and motorcycles, a variety of systems have been developed to reduce the unburned hydrocarbons and carbon monoxide exhausted from an engine. One approach has been to introduce air into the exhaust passages at points adjacent the exhaust ports. In the area of the exhaust port, the temperature of the exhaust remains high enough so that the additional air will further oxidize the hydrocarbons and carbon monoxide, forming carbon dioxide and water.

As emission control requirements have been applied specifically to motorcycles, a need for a compact, uncomplicated and durable air introduction system has come to be recognized. The size and arrangement of motorcycle engines and associated equipment is such that a large system or a plurality of systems to provide air to V-type engines have been found to have substantial drawbacks. V-type engines used in motorcycles generally employ a transverse crankshaft and have the exhaust passages extending from the cylinders toward the front of the motorcycle from one bank and toward the rear of the motorcycle from the other bank. Heretofore, this normal exhaust arrangement has not lent itself to a compact, single air injection system. Alternatively, multiple air injection systems create needless weight, complication and resulting loss of reliability.

The need for compact air introduction equipment has also raised problems at the intersection of the air introduction passage and the exhaust passage. It is often inconvenient to provide a perpendicular intersection between these passages. As a result, the opening and associated passage may create weaknesses in the engine block or cylinder head. Additionally, the nozzle size of the hole in more tangential intersections of the passages is difficult to control in manufacture or free from carbon deposits during service. Thus, a plurality of practical difficulties have arisen in the provision of a efficient, compact and reliable air introduction arrangement for motorcycle exhaust systems.

SUMMARY OF THE INVENTION

The present invention is directed to emission control using exhaust system air introduction. The present invention provides a compact, efficient and reliable system for delivering air to the exhaust passages of a motorcycle engine.

In a first aspect of the present invention, a central manifold is positioned within the central space provided between cylinders in a V-type motorcycle engine. Passages then extend in convenient arrangements to the exhaust passages. Such an arrangement provides a compact system of minimal complexity and high reliability.

In another aspect of the present invention, a pipe is employed in association with the air introduction passages directed to the exhaust passages. The pipe includes predefined nozzles to overcome the difficulties of achieving properly sized nozzles in such systems. Such pipes may also be removed for cleaning of carbon from the system. The pipes may be made of hard and durable material not subject to the same structural and heat stress limitations of the engine block or cylinder head material.

Accordingly, it is an object of the present invention to provide improved air introduction systems for pollution control on internal combustion engines. Other and further objects and advantages will appear hereinafter.

BRIEF DESCRIPTION OF THE DRAWINGS

FIG. 8 is a side elevation of a motorcycle engine of yet another embodiment of the present invention.

FIG. 9 is a bottom view of one head of the motorcycle engine of FIG. 8.

FIG. 10 is a side elevation of the head of FIG. 9 with a portion broken away for clarity.

FIG. 11 is a cross-sectional view taken along line 11—11 of FIG. 10.

FIG. 12 is a cross-sectional view taken along line 12—12 of FIG. 11.

FIG. 13 is a cross-sectional view taken along line 11—11 of FIG. 10 illustrating an altered embodiment of the device of FIG. 11.

DETAILED DESCRIPTION OF THE PREFERRED EMBODIMENTS

Figure 1:
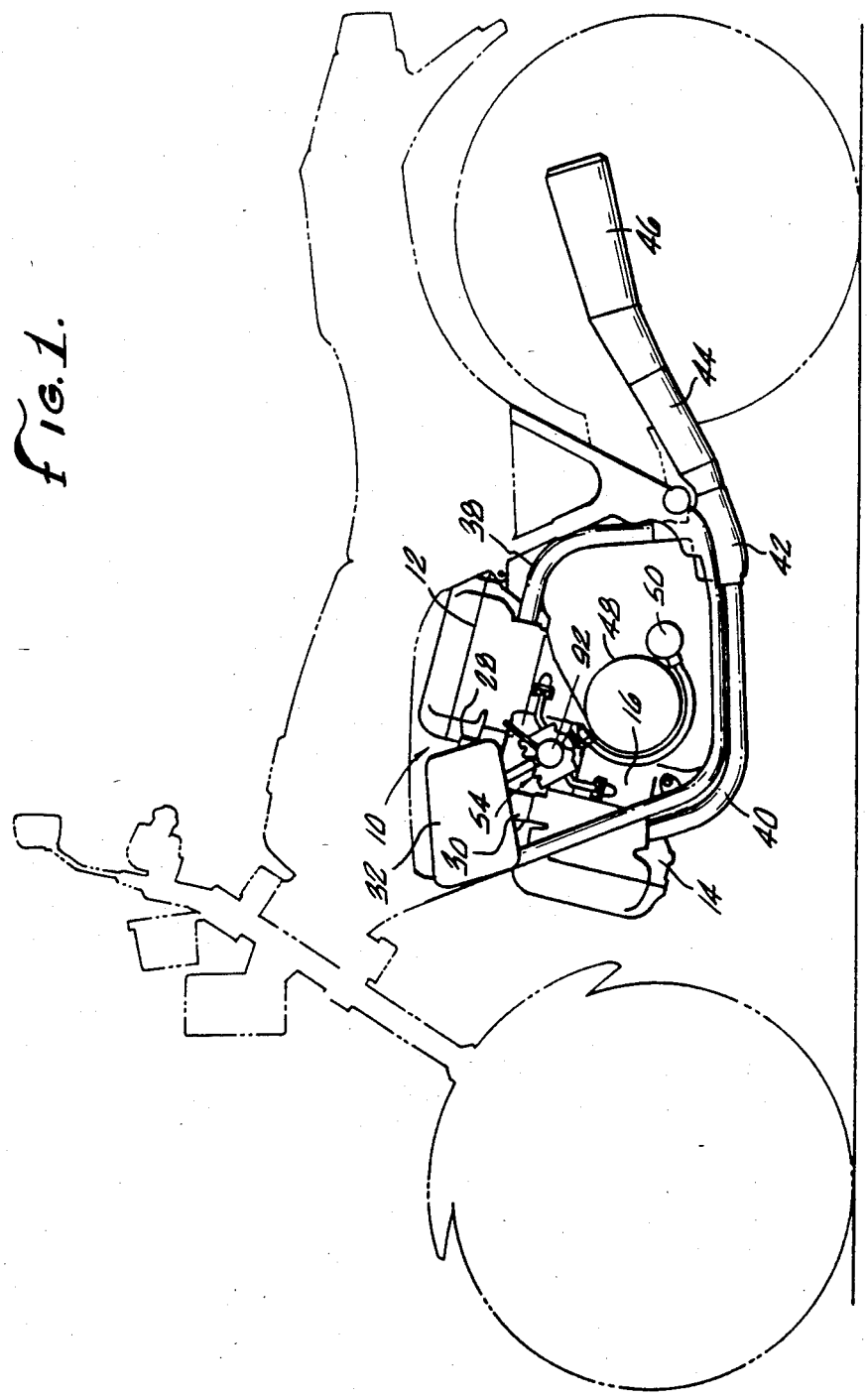
FIG. 1 is a side elevation of a motorcycle engine employing a first embodiment of the present invention.

Turning in detail to the drawings, and particularly the first embodiment of FIGS. 1-6, a motorcycle engine, generally designated 10, of the V-type is shown to be arranged with the crankshaft oriented transversely to the motorcycle. The engine 10 is illustrated as having two cylinder heads 12 and 14 associated with a V-type engine block 16. The arrangement of the V-type engine block 16 and the cylinder heads 12 and 14 define a space between the banks of cylinders. Four cylinders 18 are shown in this first embodiment to be arranged in banks of two on either side of the space defined by the engine.

The intake system for the engine including intake valves 20, intake passages 24 and 26 and carburetors 28 and 30 associated with the intake passages 24 and 26, respectively, extend inwardly from the cylinders to the space defined between the cylinder banks. An air cleaner 32 is arranged about the intakes of the carburetors 28 and 30 to insure the intake of clean air into the engine. As the carburetors 28 and 30 extend in alignment with the intake passages 24 and 26, there remains a substantial space between the banks of cylinders in the V-type engine block 16.

The exhaust system of the engine includes exhaust valves 34 at exhaust ports in the cylinder heads 12 and 14. Extending outwardly from the exhaust ports are exhaust passages 36. These exhaust passages 36 extend outwardly in a direction away from or on the other sides of the cylinders from the space defined between the banks of cylinders. Extending from the ends of the exhaust passages 36 exiting from the cylinder heads 12 and 14 are exhaust pipes 38 and 40 which extend around the engine block and transmission system to a collector 42. Extending rearwardly from the collector 42 are one or two pipes including catalytic converters 44 and exhaust mufflers 46.

Figure 2:
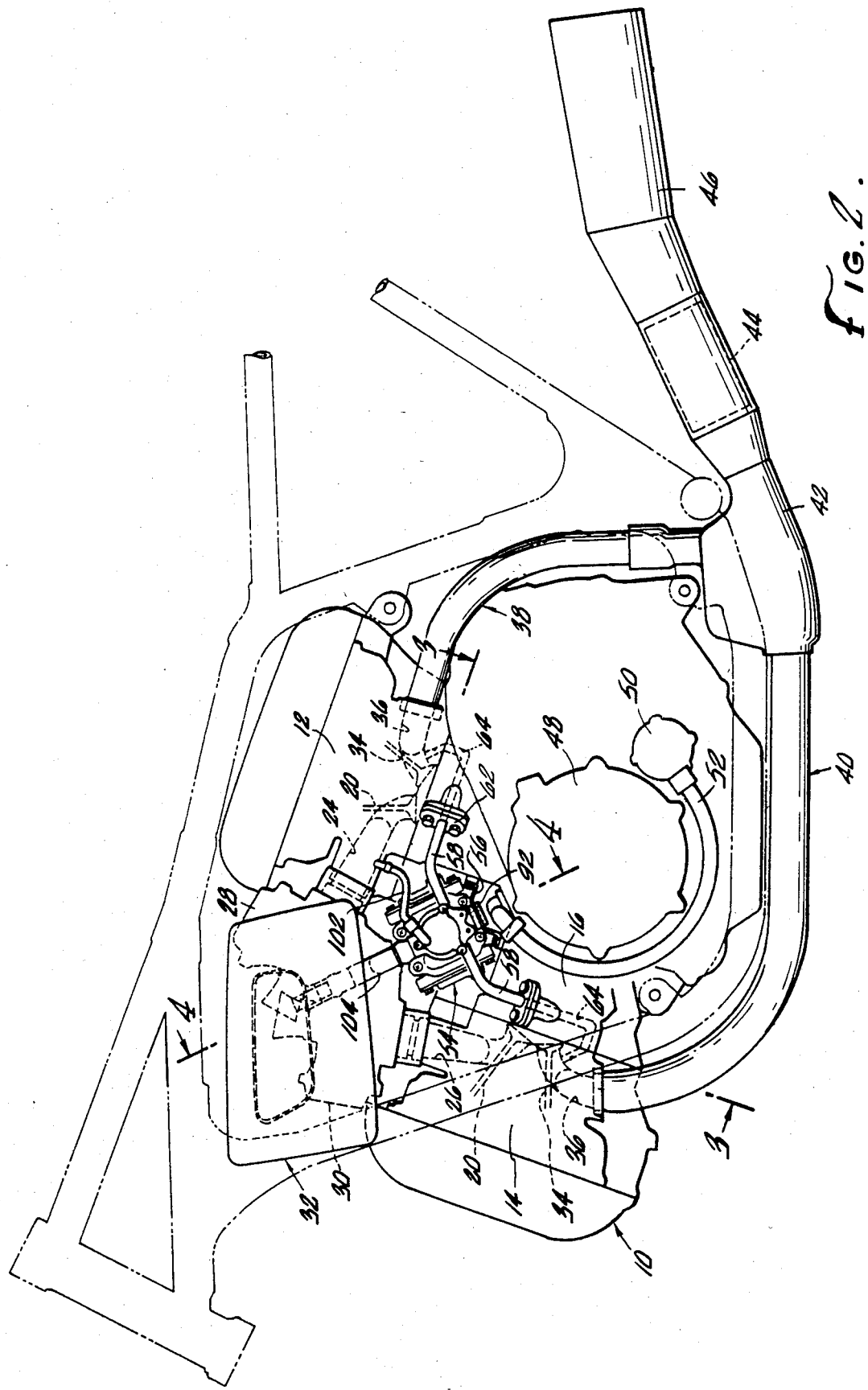
FIG. 2 is a more detailed side elevation of the motorcycle engine of FIG. 1.
Figure 3:
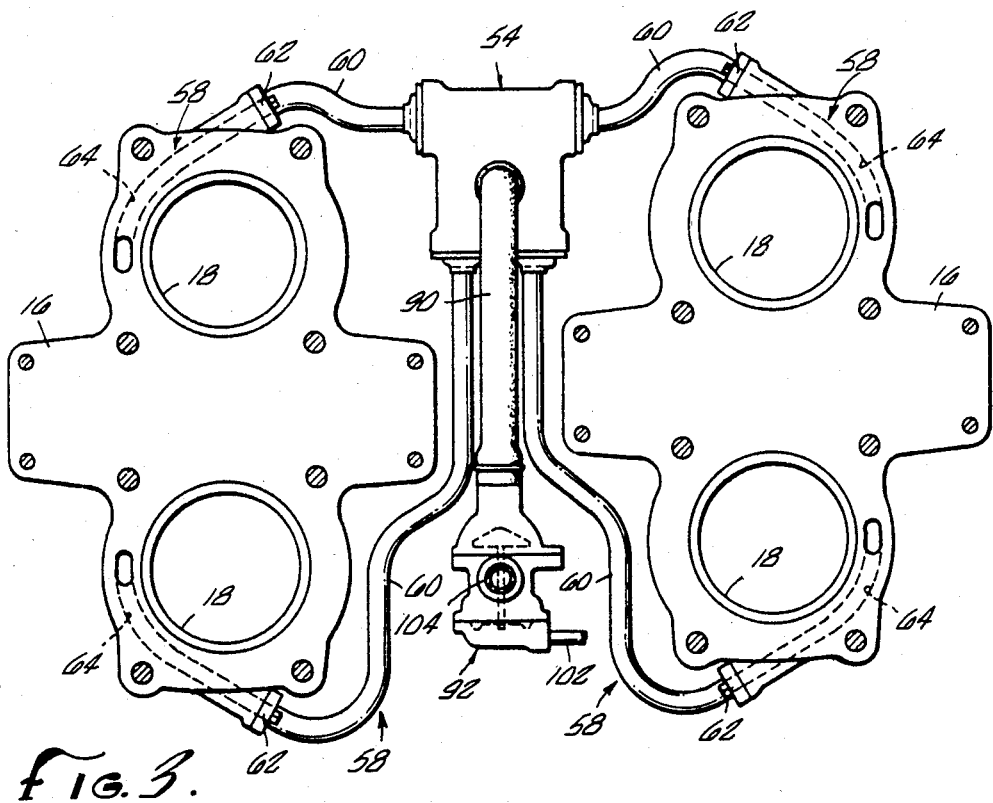
FIG. 3 is a detailed plan view taken along line 3—3 of FIG. 2.
Figure 4:
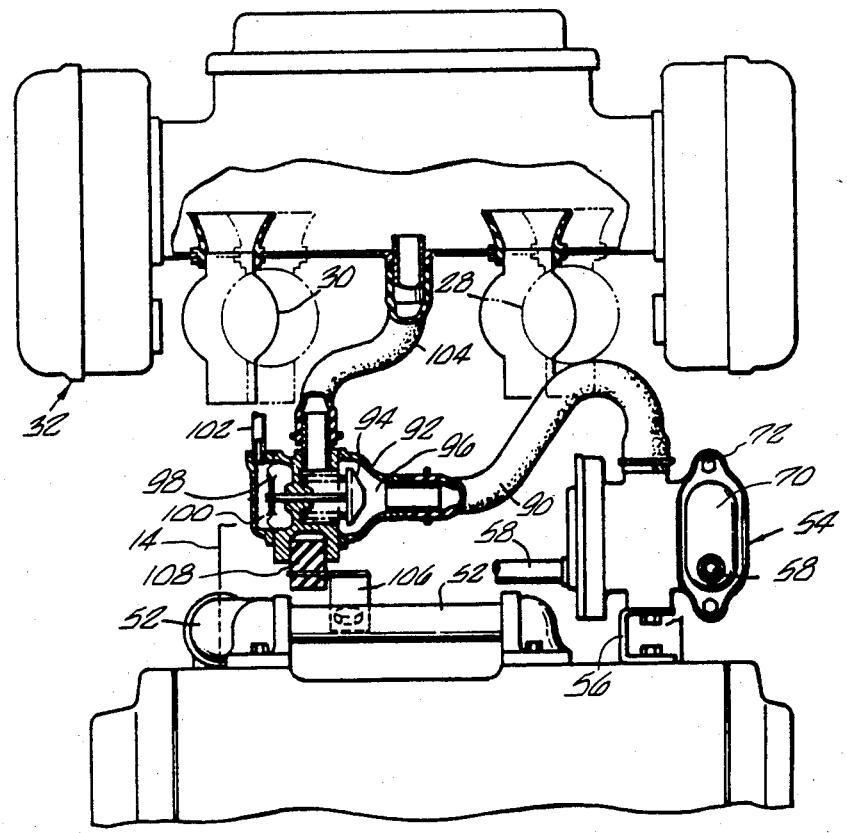
FIG. 4 is a detailed elevation taken along line 4—4 of FIG. 2.
Figure 5:
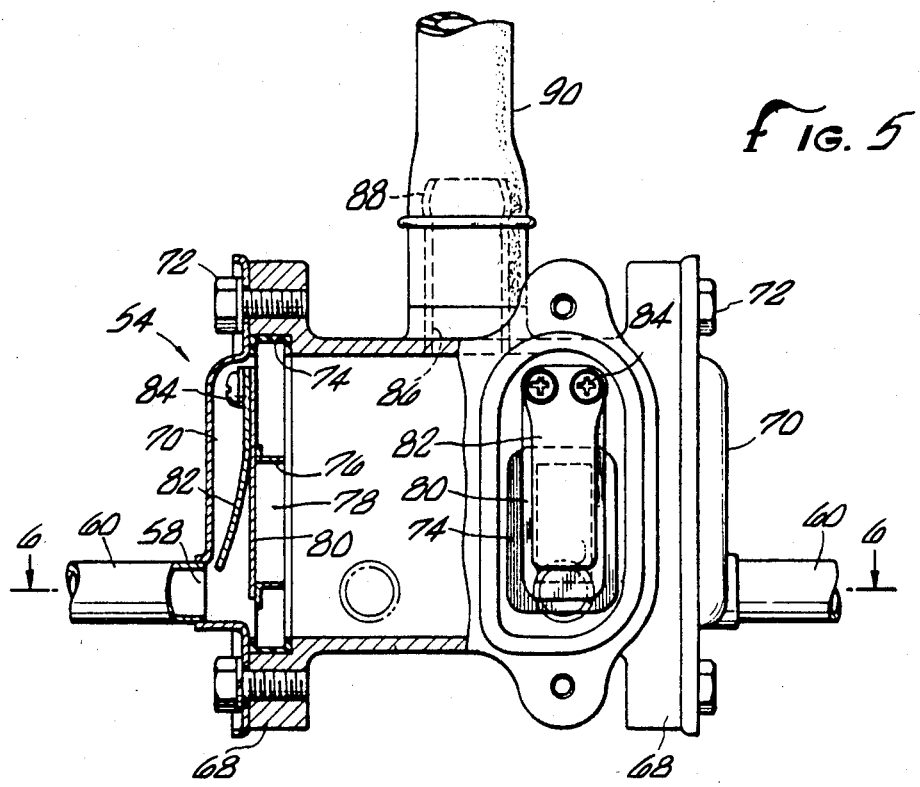
FIG. 5 is a detailed elevation in cross section of the air manifold of the first embodiment of the present invention.
Figure 6:
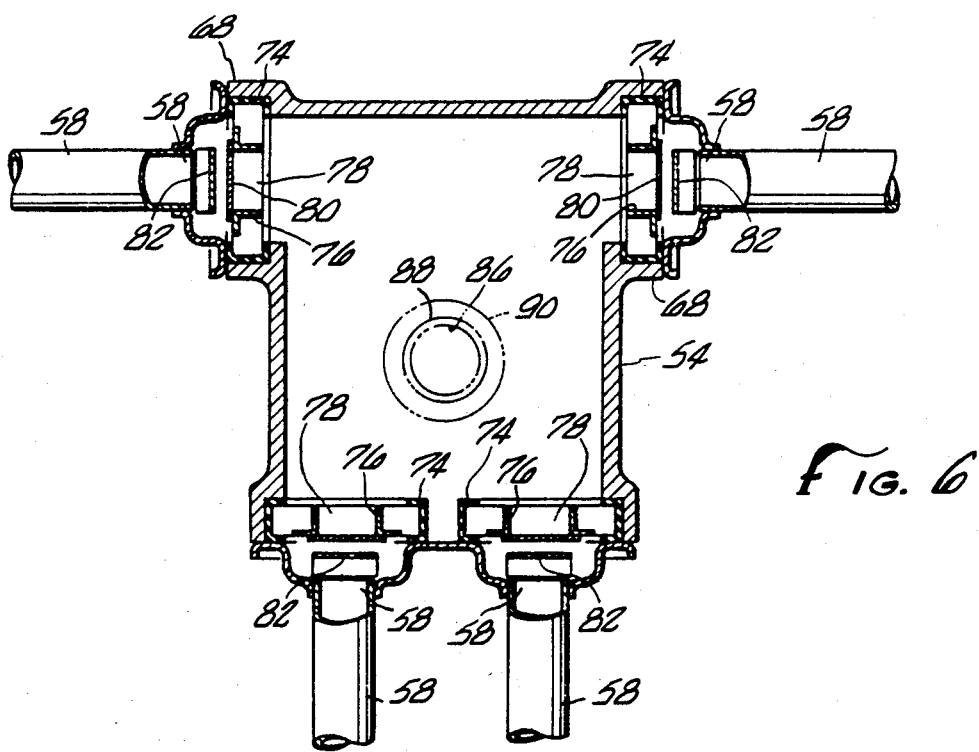
FIG. 6 is a cross-sectional plan view taken along line 6—6 of FIG. 5.

The engine 10 is illustrated in its appropriate location on the motorcycle. An outline of the motorcycle is illustrated in phantom in FIG. 1 while a portion of the frame is illustrated in FIG. 2. Additionally, a generator 48 run by the end of the crankshaft is illustrated as is a cooling fluid pump 50 with a line 52 extending upwardly and into the apex of the V for distribution to the engine.

Located within the area defined between the banks of cylinders and beneath the carburetors is an air introduction device. The device includes an air manifold 54 which is fixed by means of a bracket 56 to the inner portion of the engine block 16. The air manifold 54 provides a distribution function to a number of air passages 58 which extend from the air manifold 54 to the exhaust passages 36. The air passages 58 illustrated in this first embodiment include tubes 60 extending from the air manifold 54 to the engine block 16. At the engine block 16, joints 62 connect the tubes 60 to passageways 64 extending through the engine body including the engine block 16 and the cylinder heads 12 and 14 to the exhaust passages 36. The air passages 58 are thus caused to circumvent each cylinder so as to terminate at an optimum location in the exhaust passages 36 and yet have a centrally located, uncomplicated manifold device.

The air manifold 54 includes a number of reed valve devices associated with each air passage 58. Each valve body 68 is formed as part of the air manifold 54 and has a valve cover 70 to which the inlet end of the air passages 58 extend. The valve cover 70 is held to the valve body 68 by means of fasteners 72. The valve components contained within the valve body 68 are mounted in a rubber mounting 74 and each include a valve seat 76 through which is defined a valve gate 78. A reed valve 80 extends over the valve seat 76 to close the valve in the relaxed position. A stop 82 is arranged to prevent the reed valve 80 from opening to such an extent as to become permanently warped or bent. The valve stop 82 and reed valve 80 are held in place by fasteners 84.

An intake port 86 is associated with the upper side of the air manifold 54 and includes an inlet nipple 88 to receive an air inlet tube 90. The tube 90 extends to a control valve 92. The control valve 92 includes a valve 94 connected by a valve stem 96 to a diaphragm 98. The diaphragm 98 divides a control chamber to define a vacuum chamber 100. The vacuum chamber 100 is controlled by a vacuum line 102 extending to the intake system. The control valve 92 is arranged such that during deceleration, when there is high vacuum in the intake, the valve is closed and during heavy acceleration, the valve is open.

The valve is positioned to control passage of air from an air supply passage 104 to the air inlet through tube 90 to the air manifold 54. The air supply passage 104 conveniently extends to the air cleaner 32 for the engine intake system. The control valve 92 is mounted conveniently to a rigidly fixed portion of the coolant line 52 by means of a bracket 106 and a rubber mount 108 designed to reduce vibrations to the control valve 92.

The air introduction device is actuated by the operation of the reed valves 80 which open when reduced pressure exists within the exhaust passages 36 and closes when higher pressure is encountered. Thus, air is drawn during selected periods into the exhaust passages 36.

Figure 7:
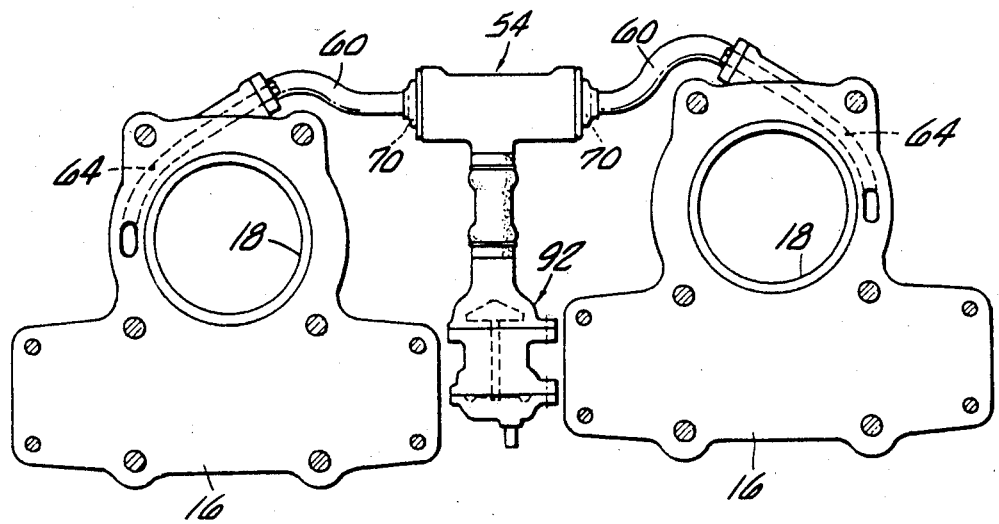
FIG. 7 is a second embodiment illustrating a two-cylinder arrangement in a view similar to that of FIG. 3.

An embodiment illustrating use of the present system with a two-cylinder V-type engine is illustrated in FIG. 7. Naturally, the air manifold 54 only requires two air passages 58 extending therefrom to the appropriate locations adjacent the cylinders. The system otherwise employs substantially identical components to that of the embodiment of FIGS. 1–6, the same reference numbers being used for corresponding components in the figures.

Looking next to the embodiment of FIGS. 8–12, a similar motorcycle engine arrangement is illustrated. As a majority of the components of the system are substantially identical to that of the prior embodiments, the same reference numerals will be applied as have been applied to the prior embodiments with the accompanying description being equally applicable. This embodiment may be distinguished from that of the prior description by the employment of particular air passageways 110 extending from the tubes 60. Additionally, multiple intake valves 112 and exhaust valves 114 are employed with each cylinder. Corresponding branch intake passages 116 and exhaust passages 118 extend to meet the intake valves 112 and exhaust valves 114, respectively.

Each air passageway 110 includes a bore 120 which extends through the cylinder head 12 so as to come into a partially overlapping tangential intersection with the exhaust passage 118. It is not intended that this intersection result in an actual point contact between the passage surface and the bore surface. Some overlapping intersection is intended such that a hole 122 is created at each such intersection of the exhaust passages 118 and bores 120. The overlapping need not be such that the centerline of the bore 120 intersects the passage 118. As can be seen in FIG. 11, the relative sizes of bore 120 and the exhaust passage 118, sized for other considerations, need overlap only to a small extent in order to form a large enough opening or hole for proper operation.

Extending within each bore 120 is a pipe 124 acting to generally line the bore 120. The pipe 124 is flanged on its outer end to cooperate with a gasket 126 and screw 128 within a boss 130 to retain the pipe 124 in position. A cap 132 and resilient washer 134 retain and seal each tube 60 in the screw 128 for communication through a bore 136 of the screw with the interior of the pipe 124.

The pipe 124 extends to and past each branch of the exhaust passage 118 to effectively close each hole 122 with exception of a nozzle 138 extending through the wall of the pipe 124. The nozzles 138 are properly formed and sized by any convenient process when the pipe 124 is conveniently withdrawn from the bore 120.

FIG. 12 illustrates a mating asymmetry between the bore 120 and pipe 124 to insure appropriate alignment and retention of the pipe 124 in place. A protrusion 140 fits within a channel 142 cut into the wall of the bore 120.

In the event that more air is delivered to the exhaust passage 118 which is most adjacent the input end of the pipe, the nozzles 138 may be varied in cross-sectional size. This arrangement is illustrated in FIG. 113 where the nozzle most distant from the source of air is larger than the closer nozzle. Consequently, the flow may be balanced between branches of the exhaust passage 118.

Thus, a compact, uncomplicated and reliable air introduction device has been disclosed in several embodiments. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An air introduction device for the exhaust system of an engine having exhaust ports and exhaust passages leading therefrom, comprising
   a bore in the engine extending in a partially overlapping tangential intersection with one of said exhaust passage near the exhaust port, thereby defining a hole between said bore and the exhaust passage; and
   a pipe rigidly positioned in said bore to line said bore at least adjacent said hole, said pipe including a nozzle through the sidewall thereof aligned with said hole.

2. The device of claim 1 wherein said bore and said pipe extend beyond the intersection in both directions.

3. The device of claim 1 wherein said bore and said pipe include a mating asymmetry to prevent relative rotation.

4. The device of claim 1 wherein said bore extends in partially overlapping tangential intersection with at least two exhaust passages, thereby defining at least two holes between said bore and the exhaust passages and said pipe includes a plurality of nozzles through the sidewall thereof aligned with said holes.

5. The device of claim 4 wherein said nozzles are progressively larger further from the pipe inlet.

6. An air introduction device for the exhaust system of an engine having exhaust ports and exhaust passages leading therefrom, comprising
   an air manifold fixed relative to the engine;
   an air inlet to said air manifold;
   a plurality of air passages extending from said air manifold to the engine;
   bores in the engine extending in partially overlapping tangential intersection with the exhaust passages, thereby defining holes between said bores and the exhaust passages; and
   pipes rigidly positioned in said bores to line said bores at least adjacent said holes, said pipes including nozzles through the sidewalls thereof aligned with said holes, said pipes being coupled to said air passages.

7. The device of claim 6 further comprising valves for controlling communication between said air manifold and each of said air passages.

8. The device of claim 7 wherein said valves are reed valves.

9. The device of claim 6 wherein said bore and said pipe include a mating asymmetry to prevent relative rotation.

10. The device of claim 6 wherein said bore extends in partially overlapping tangential intersection with at least two exhaust passages, thereby defining at least two holes between said bore and the exhaust passages and said pipe includes a plurality of nozzles through the sidewall thereof aligned with said holes.

11. The device of claim 10 wherein said nozzles are progressively larger further from the pipe inlet.

12. An air introduction device for the exhaust system of a V-type engine having a space between the cylinders and exhaust passages, comprising
   an air manifold positioned within the space between the cylinders in the V-type engine;
   an air inlet to said air manifold;
   a plurality of air passages extending from said air manifold to the engine;
   bores in the engine extending in partially overlapping tangential intersection with the exhaust passages, thereby defining holes between said bores and the exhaust passages; and
   pipes rigidly positioned in said bores to line said bores at least adjacent said holes, said pipes including nozzles through the sidewalls thereof aligned with said holes, said pipes being coupled to said air passages.

13. The device of claim 12 further comprising valves for controlling communication between said air manifold and each of said air passages.

14. The device of claim 13 wherein said valves are reed valves.

15. The device of claim 12 wherein said bore and said pipe include a mating asymmetry to prevent relative rotation.

16. The device of claim 12 wherein said bore extends in partially overlapping tangential intersection with at least two exhaust passages, thereby defining at least two holes between said bore and the exhaust passages and said pipe includes a plurality of nozzles through the sidewall thereof aligned with said holes.

17. The device of claim 16 wherein said nozzles are progressively larger further from the pipe inlet.

18. An air introduction device for the exhaust system of a V-type engine having a space between the cylinders and exhaust passages extending from the cylinders on the opposite side of the cylinders from the space between the cylinders, comprising
   an air manifold positioned within the space between the cylinders in the V-type engine;
   an air inlet to said air manifold;
   bores in the engine extending in partially overlapping tangential intersection with the exhaust passages, thereby defining holes between said bores and the exhaust passages;
   pipes rigidly positioned in said bores to line said bores at least adjacent said holes, said pipes including nozzles through the sidewalls thereof aligned with said holes; and
   a plurality of air passages extending from said air manifold and about the cylinders to said pipes; and
   reed valves for controlling communication between said air manifold and each of said air passages.

19. The device of claim 18 wherein said bore and said pipe extend beyond the intersection in both directions.

20. The device of claim 18 wherein said bore and said pipe include a mating asymmetry to prevent relative rotation.

21. The device of claim 18 wherein said bore extends in partially overlapping tangential intersection with at least two exhaust passages, thereby defining at least two holes between said bore and the exhaust passages and said pipe includes a plurality of nozzles through the sidewall thereof aligned with said holes.

22. The device of claim 18 wherein said nozzles are progressively larger further from the pipe inlet.

23. The device of claim 18 wherein there are four said passages and four said reeds for the exhaust passages of four cylinders.

24. The device of claim 18 wherein there are two said passages and two said reeds for the exhaust passages of two cylinders.

* * * * *